US011622198B2

(12) United States Patent
Son et al.

(10) Patent No.: US 11,622,198 B2
(45) Date of Patent: Apr. 4, 2023

(54) ELECTRONIC DEVICE, AND METHOD FOR PROCESSING STEREO AUDIO SIGNAL THEREOF

(71) Applicant: Samsung Electronics Co., Ltd., Gyeonggi-do (KR)

(72) Inventors: Beakkwon Son, Gyeonggi-do (KR); Yangsu Kim, Gyeonggi-do (KR); Sangsoo Park, Gyeonggi-do (KR); Jaeha Park, Gyeonggi-do (KR); Jaemo Yang, Gyeonggi-do (KR); Keunwon Jang, Gyeonggi-do (KR); Hyunmin Choi, Gyeonggi-do (KR); Gangyoul Kim, Gyeonggi-do (KR); Hangil Moon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/042,429

(22) PCT Filed: Apr. 15, 2019

(86) PCT No.: PCT/KR2019/004530
§ 371 (c)(1),
(2) Date: Sep. 28, 2020

(87) PCT Pub. No.: WO2019/199153
PCT Pub. Date: Oct. 17, 2019

(65) Prior Publication Data
US 2021/0120339 A1 Apr. 22, 2021

(30) Foreign Application Priority Data
Apr. 13, 2018 (KR) .................. 10-2018-0043525

(51) Int. Cl.
*H04R 5/04* (2006.01)

(52) U.S. Cl.
CPC ........... *H04R 5/04* (2013.01); *H04R 2400/01* (2013.01); *H04R 2499/11* (2013.01)

(58) Field of Classification Search
CPC ...... H04R 5/02; H04R 5/04; H04R 2205/022; H04R 2205/041; H04R 3/12;
(Continued)

(56) References Cited

U.S. PATENT DOCUMENTS 8,452,020 B2    5/2013  Gregg et al.
9,706,304 B1    7/2017  Kelso et al.
(Continued)

FOREIGN PATENT DOCUMENTS

CN    101309317 A    11/2008
CN    103999479 A    8/2014
(Continued)

OTHER PUBLICATIONS

European Search Report dated Feb. 24, 2021.
Chinese Search Report dated Oct. 28, 2021.

*Primary Examiner* — Ahmad F. Matar
*Assistant Examiner* — Sabrina Diaz
(74) *Attorney, Agent, or Firm* — Cha & Reiter, LLC

(57) ABSTRACT

An electronic device, according to various embodiments of the present invention, comprises: a first speaker arranged on one side end of the electronic device; a second speaker arranged on the other side end of the electronic device; at least one sensor; and a processor, wherein the processor may be configured so as to receive a first audio signal, acquire a first channel signal and a second channel signal by using the first audio signal, acquire state information associated with the electronic device by using the at least one sensor, correct at least one portion of the first channel signal on the basis of at least the state information, output the corrected first channel signal using the first speaker, and output the second (Continued)

channel signal using the second speaker. In addition, various embodiments are possible.

13 Claims, 7 Drawing Sheets

(58) Field of Classification Search
CPC ............ H04R 2499/15; H04R 2499/11; H04R 2400/01; H04S 3/00; H04S 1/002; H04S 7/301; H04S 7/302; H04S 7/303; H04S 7/307; H04S 2400/12; H04N 5/642; G06F 1/1605; H03G 3/001; H03G 3/002; H03G 3/00; H03G 3/32; H03G 3/3089; H03G 1/0088; H03G 7/007; H04H 60/04
USPC .......................... 381/300, 303, 306, 104, 107
See application file for complete search history.

(56) References Cited

U.S. PATENT DOCUMENTS

| | | | |
|---|---|---|---|
| 2004/0204194 A1 | 10/2004 | Akai et al. | |
| 2013/0089161 A1* | 4/2013 | Heineman | H03F 3/45 375/295 |
| 2013/0094668 A1* | 4/2013 | Poulsen | H03G 3/301 381/107 |
| 2013/0156209 A1 | 6/2013 | Visser et al. | |
| 2013/0279706 A1* | 10/2013 | Marti | G06F 1/1688 381/57 |
| 2014/0081630 A1 | 3/2014 | Jung | |
| 2014/0099992 A1 | 4/2014 | Burns et al. | |
| 2014/0329567 A1 | 11/2014 | Chan et al. | |
| 2014/0357251 A1 | 12/2014 | Forutanpour et al. | |
| 2014/0369527 A1* | 12/2014 | Baldwin | H03G 3/20 381/107 |
| 2015/0229749 A1 | 8/2015 | Cho et al. | |
| 2016/0044394 A1* | 2/2016 | Derom | H04R 29/00 367/95 |
| 2016/0050304 A1 | 2/2016 | Tung | |
| 2016/0205475 A1 | 7/2016 | Shanmugam et al. | |
| 2017/0070839 A1 | 3/2017 | Mihelich et al. | |
| 2018/0192195 A1 | 7/2018 | Du | |

FOREIGN PATENT DOCUMENTS

| | | |
|---|---|---|
| EP | 2 582 045 A1 | 4/2013 |
| JP | 2004-56408 A | 2/2004 |
| KR | 10-1177772 B1 | 8/2012 |
| KR | 10-2014-0036584 A | 3/2014 |
| KR | 10-2015-0048065 A | 5/2015 |
| TW | M546066 U | 7/2017 |

* cited by examiner

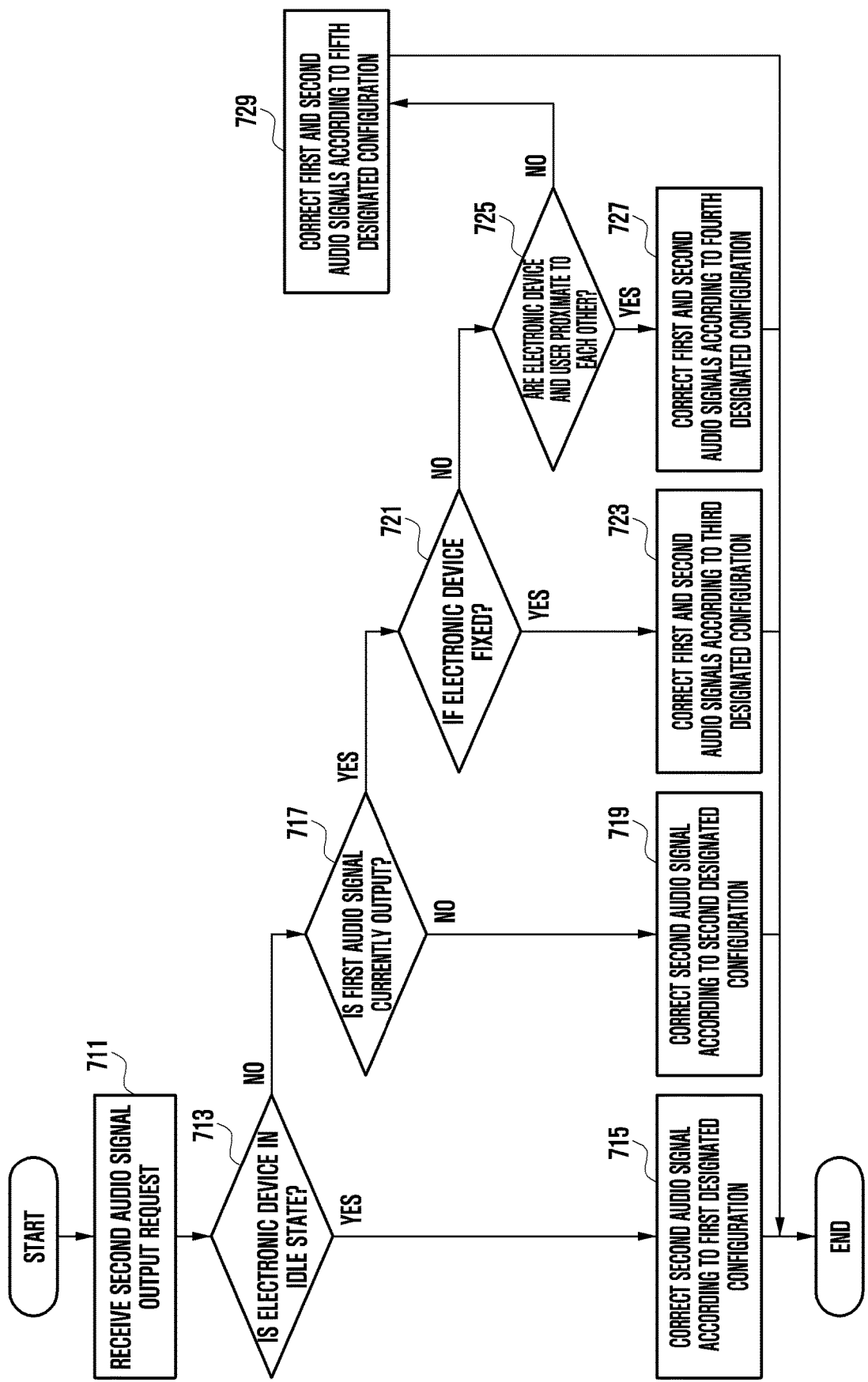

ELECTRONIC DEVICE, AND METHOD FOR PROCESSING STEREO AUDIO SIGNAL THEREOF

CROSS-REFERENCE TO RELATED APPLICATION(S)

This application is a National Phase Entry of PCT International Application No. PCT/KR2019/004530, which was filed on Apr. 15, 2019 and claims priority to Korean Patent Application No. 10-2018-0043525, which was filed on Apr. 13, 2018, the contents of which are incorporated herein by reference.

TECHNICAL FIELD

Various embodiments of the disclosure relate to an electronic device and a method for processing a stereo audio signal thereby.

BACKGROUND ART

Nowadays, various portable electronic devices have appeared, including smartphones, tablet PCs, portable multimedia players (PMPs), personal digital assistants (PDAs), laptop personal computers, and wearable devices such as wrist watches and head-mounted displays.

Such electronic devices may provide a call function and a function of processing and outputting audio data which is received from another external electronic device, or which is related to an application stored in the memory thereof.

DISCLOSURE OF INVENTION

Technical Problem

An electronic device may output audio signals at various levels of loudness and sound quality by processing audio data. For example, an electronic device may output a bell sound, a media sound, a touch sound, and the like.

Electronic devices including stereo speakers have recently appeared. Such electronic devices including stereo speakers may provide improved audio experiences (for example, stereo/stereoscopic sounds) and enable such audio sounds to be heard at a high level of loudness.

In line with the trend towards compactness and lightness, electronic devices may include no separate call speaker (receiver), in order to overcome the structural problem thereof, and may be configured to perform a receiver function and a speaker function by using one of the stereo speakers.

A user may make a handset call by using a speaker. The user may erroneously select a speaker call mode while making the handset call. In addition, playback of a notification sound may be requested inadvertently. In this case, the speaker of the electronic device may output sounds in close proximity to the user's ears, thereby inconveniencing the user. In worse cases, the user's hearing may be impaired.

Solution to Problem

An electronic device and a method for processing a stereo audio signal thereby, according to various embodiments of the disclosure, may detect the state of proximity between the speaker of the electronic device and the user's ears, and may adjust the audio volume level accordingly.

An electronic device and a method for processing a stereo audio signal thereby, according to various embodiments of the disclosure, may provide an efficient stereo sound output in a range in which the user is not inconvenienced.

An electronic device according to various embodiments of the disclosure may include: a first speaker disposed on a side end of the electronic device; a second speaker disposed on a different side end of the electronic device; at least one sensor; and a processor. The processor may be configured to: receive a first audio signal; acquire a first channel signal and a second channel signal by using the first audio signal; acquire state information related to the electronic device by using the at least one sensor; correct at least a part of the first channel signal, at least based on the state information; output the corrected first channel signal by using the first speaker; and output the second channel signal by using the second speaker. A method for processing a stereo audio signal by an electronic device including a first speaker and a second speaker according to various embodiments of the disclosure may include the operations of: receiving a first audio signal; acquiring a first channel signal and a second channel signal by using the first audio signal; acquiring state information related to the electronic device by using at least one sensor; correcting at least a part of the first channel signal, at least based on the state information; and outputting the corrected first channel signal by using the first speaker and outputting the second channel signal by using the second speaker.

Advantageous Effects of Invention

An electronic device and a method for processing a stereo audio signal thereby, according to various embodiments of the disclosure, may provide an efficient stereo sound output while protecting the user's hearing, thereby improving his/her audio experience.

BRIEF DESCRIPTION OF DRAWINGS

FIG. 7 is a flowchart illustrating a method for processing a stereo audio signal according to various embodiments.

MODE FOR THE INVENTION

Figure 1:
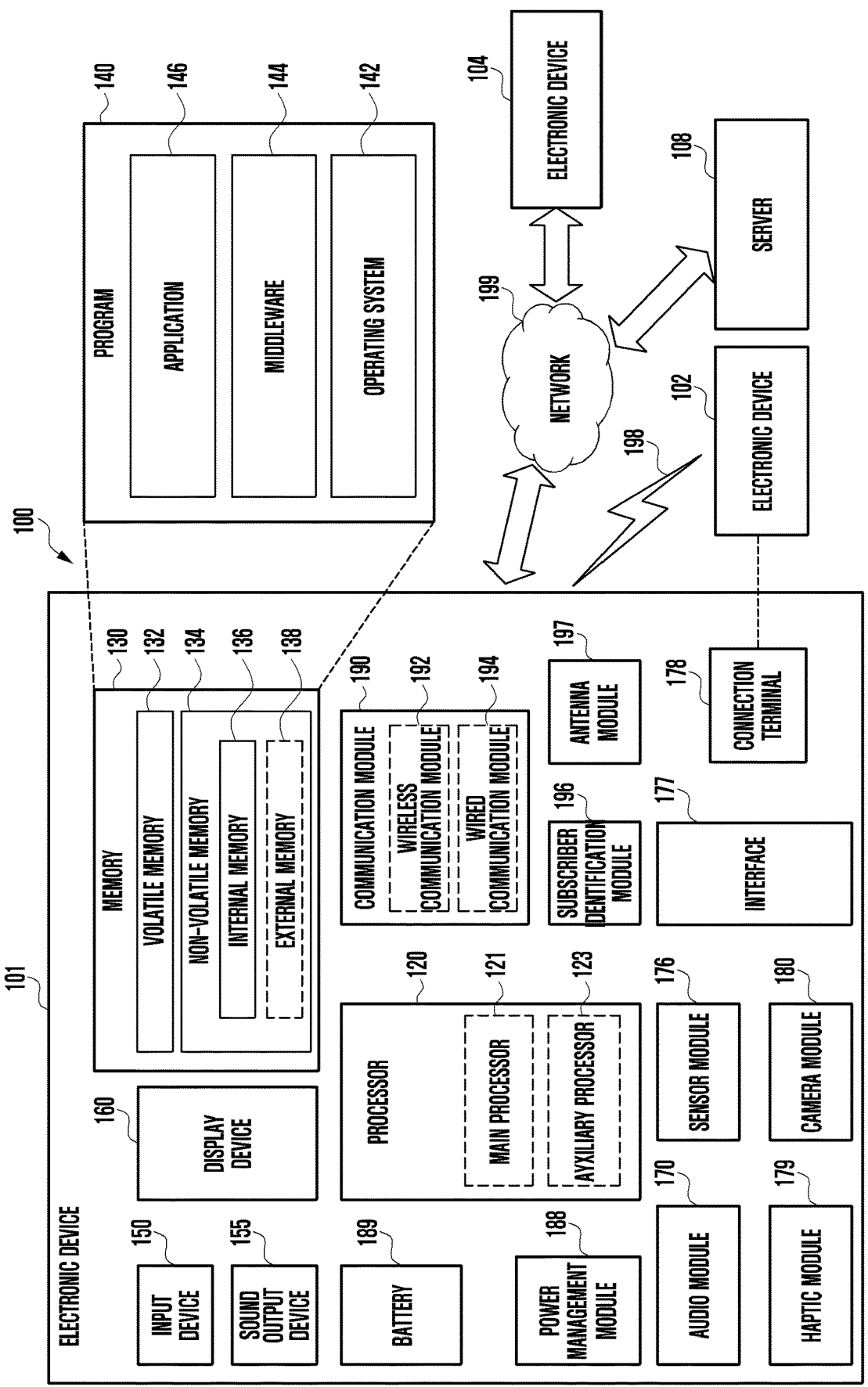
FIG. 1 is a block diagram of an electronic device inside a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
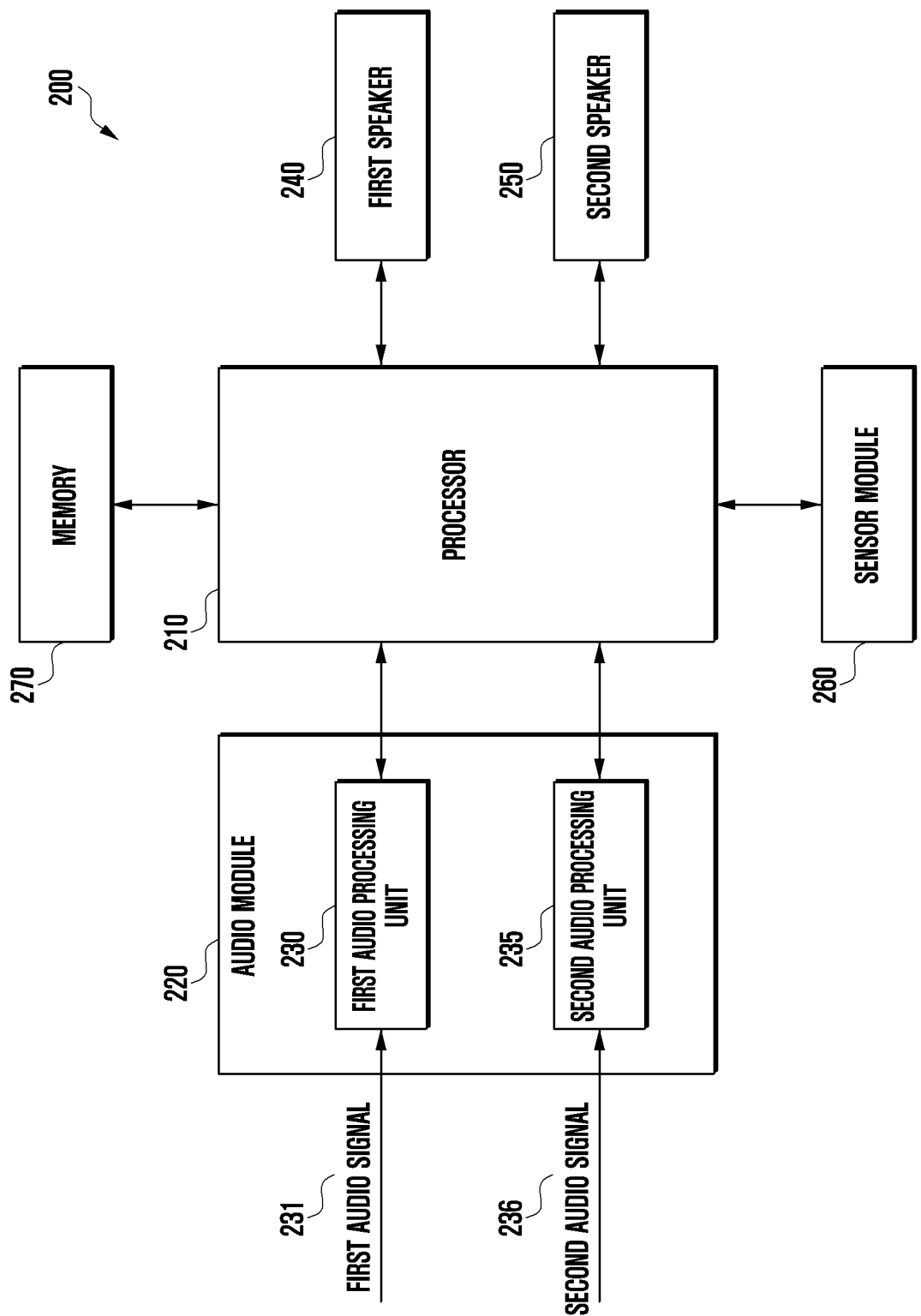
FIG. 2 is a block diagram of an electronic device according to various embodiments.

FIG. 2 is a block diagram of an electronic device according to various embodiments.

Referring to FIG. 2, the electronic device 200 (for example, the electronic device 101 in FIG. 1) may include a processor 210 (for example, the processor 120 in FIG. 1), an audio module 220 (for example, the audio module 170 in FIG. 1), a first speaker 240 (for example, the sound output device 155 in FIG. 1), a sensor module 260 (for example, the sensor module 176 in FIG. 1), and a memory 270 (for example, the memory 130 in FIG. 1). According to an embodiment, at least one of the above components of the electronic device 200 may be omitted, or one or more other components may be added thereto.

According to various embodiments, by driving an operating system or an application program, for example, the processor 210 control multiple hardware or software components connected to the processor 210 and may perform processing and computation of various pieces of data. The processor 210 may be implemented as a system-on-chip (SoC), for example. According to an embodiment, the processor 210 may further include a graphic processing unit (GPU) and/or an image signal processor 210. The processor 210 may include at least some of the components illustrated in FIG. 2 (for example, the first audio processing unit 230 and/or the second audio processing unit 235). The processor 210 may load a command or data received from at least one of other components (for example, nonvolatile memory 270) into a volatile memory 270, process the same, and store the result data in the nonvolatile memory 270.

According to various embodiments, the audio module 220 may include a first audio processing unit 230 and a second audio processing unit 235. The first audio processing unit 230 and the second audio processing unit 235 may be implemented separately from, or as a part of the audio module 220.

The first audio processing unit 230 may receive a first audio signal 231 through a communication module (for example, the communication module 190 in FIG. 1). The first audio signal 231 may include various audio signals received for a call, for example. According to an embodiment, the first audio processing unit 230 may include a decoder. The first audio processing unit 230 may decode the first audio signal so as to acquire a first channel signal transferred to a first speaker 240 and a second channel signal transferred to a second speaker 250. The first audio processing unit 230 may include a gain adjustment unit, a filter, and a dynamic range controller (DRC). The first audio processing unit 230 may include a gain adjustment unit, a filter, and a dynamic range controller (DRC), which are applied to each of the first channel signal and the second channel signal, as separate circuits or as a single integrated circuit.

According to various embodiments, the second audio processing unit 235 may receive a second audio signal 236. The second audio signal 236 may include, for example, a system effect sound, a bell sound, music, a watch alarm, a notification sound, or the like. According to an embodiment, the second audio processing unit 235 may include a decoder. The second audio processing unit 235 may decode the second audio signal so as to acquire a third channel signal transferred to the first speaker 240 and a fourth channel signal transferred to the second speaker 250. According to an embodiment, the second audio processing unit 235 may include a gain adjustment unit, a filter, and a dynamic range controller (DRC). The second audio processing unit 235 may include a gain adjustment unit, a filter, and a dynamic range controller (DRC), which are applied to each of the third channel signal and the fourth channel signal, as separate circuits or as a single integrated circuit.

According to various embodiments, the first speaker 240 may be disposed on one side end of the electronic device 200. For example, the first speaker 240 may be disposed at or near the upper end of the electronic device 200 and configured to perform a receiver function and a speaker function.

According to various embodiments, the second speaker 250 may be disposed on another side end of the electronic device 200. For example, the second speaker 250 may be disposed at or near the lower end of the electronic device 200. The electronic device 200 may output stereo sounds by using the first speaker 240 and the second speaker 250. According to various embodiments, the electronic device 200 may further include at least one speaker other than the first speaker 240 and the second speaker 250.

According to various embodiments, the sensor module 260 may measure a physical quantity, for example, or sense the operating state of the electronic device 200, and may convert the measured or sensed information into an electric signal. The sensor module 260 may include, for example, at least one of a gesture sensor, a gyro sensor, an atmospheric pressure sensor, a magnetic sensor, an acceleration sensor, a grip sensor, a proximity sensor, a color sensor (for example, a red, green, blue (RGB) sensor), a biometric sensor, a temperature/humidity sensor, an illuminance sensor, or an ultraviolet (UV) sensor. The sensor module 260 may further include a control circuit for controlling at least one sensor belonging therein. In some embodiments, the electronic device 200 may further include a processor 210 configured to control the sensor module 260 as a part of separately from the processor 210, thereby controlling the sensor module 260 while the processor 210 is in a sleep state.

The memory 270 (for example, memory 130) may include, for example, an internal memory or an external memory. The internal memory may include, for example, at least one of a volatile memory (for example, DRAM, SRAM, SDRAM, or the like) or a nonvolatile memory (for example, one time programmable ROM (OTPROM), PROM, EPROM, EEPROM, mask ROM, flash ROM, flash memory, hard drive, or solid state drive (SSD)). The external memory may include a flash drive, such as compact flash (CF), secure digital (SD), micro-SD, mini-SD, extreme digital (xD), multimedia card (MMC), memory stick, or the like. The external memory may be connected to the electronic device 200 functionally or physically through various interfaces.

Figure 3:
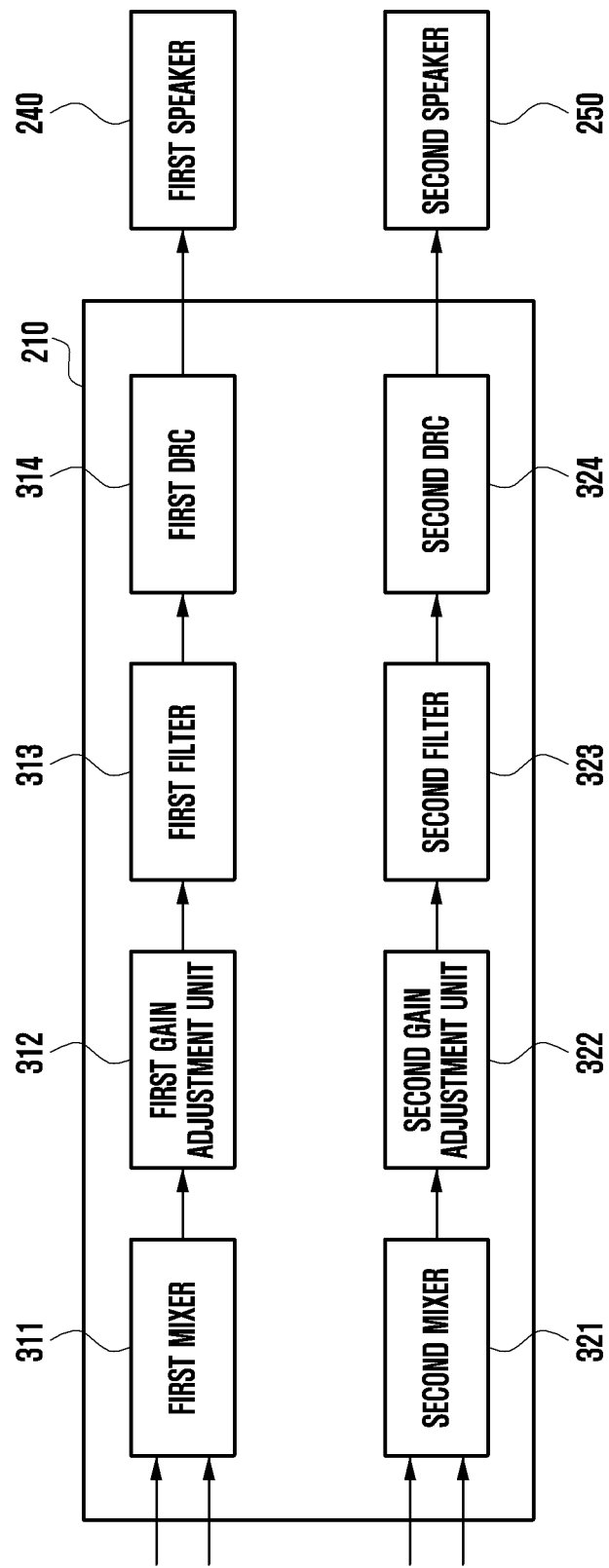
FIG. 3 is a block diagram illustrating a processor according to various embodiments.

FIG. 3 is a block diagram illustrating a processor according to various embodiments.

The processor 210 (for example, the processor 120 in FIG. 1) may include a first mixer 311, a first gain adjustment unit 312, a first filter 313, a first DRC 314, a second mixer 321, a second gain adjustment unit 322, a second filter 323, and a second DRC 324. In some embodiments, at least one of the above components (for example, the first mixer 311 or the second mixer 321) may be omitted, or one or more other components may be additionally included. In addition, the components illustrated in FIG. 3 may be modified in various orders.

According to various embodiments, the first mixer 311 may receive a first channel signal acquired form a first audio signal and a third channel signal acquired from a second audio signal, and may mix the received signals, thereby producing a single audio signal. According to an embodiment, the first mixer 311 may adjust the first channel signal and the third channel signal, based on a common specification, and then sum the same, thereby producing a single audio signal. In another embodiment, the first mixer 311 may adjust each of the first channel signal and the third channel signal, based on a designated specification, according to a designated configuration and then sum the same, thereby producing a single audio signal. In addition, it would be obvious to a person skilled in the art that, if the first mixer 311 received only one signal (that is, the first channel signal or the third channel signal), the first mixer 311 transfers the received signal to the first gain adjustment unit 312 without mixing the same.

According to various embodiments, the first gain adjustment unit 312 may adjust the loudness by applying a designated gain to a signal received from the first mixer 311. For example, the first gain adjustment unit 312 may correct a signal received from the first mixer 311 such that the first speaker 240 outputs a value equal to/lower than a predetermined volume level.

According to various embodiments, the first filter 313 may reduce or adjust energy in a specific frequency band of a signal received from the first gain adjustment unit 312. For example, the first filter 313 may filter at least a part of a signal received from the first gain adjustment unit 312 by using a high-pass filter.

According to various embodiments, the first DRC 314 may adjust the dynamic range of a signal received from the first filter 313 within a predetermined range. As used herein, the dynamic range refers to the difference (ratio) between the sound pressure of the largest sound and the sound pressure of the smallest sound in connection with an audio signal. The first DRC 314 may adjust the amplification ratio of an audio signal such that the dynamic range of the signal received from the first filter 313 lies within a predetermined range. For example, the first DRC 314 may remove a sound that exceeds the predetermined range or may adjust the ratio of the entire dynamic range such that the same lies within the predetermined range. According to an embodiment, the processor 210 may transfer an audio signal, the dynamic range of which has been adjusted by using the first DRC 314, to the first speaker 240.

According to various embodiments, the second mixer 321 may receive a second channel signal acquired from a first audio signal and a fourth channel signal acquired from a second audio signal, and may mix the received signals, thereby producing a single audio signal.

According to various embodiments, the second gain adjustment unit 322 may increase or reduce the loudness by applying a designated gain to a signal received from the second mixer 321.

According to various embodiments, the second filter 323 may decrease or increase energy in a specific frequency band of a signal received from the second gain adjustment unit 322. For example, the second filter 323 may filter at least a part of a signal received from the second gain adjustment unit 322 by using at least one of a low-pass filter, a band-pass filter, a high-pass filter, or a notch filter.

According to various embodiments, the second DRC 324 may adjust the dynamic range of a signal received from the second filter 323 within a predetermined range. For example, if a signal received from the second filter 323 is larger than a specific level of energy, the second DRC 324 may reduce the same and, if the signal is smaller than the specific level of energy, may remove the same. According to an embodiment, the processor 210 may transfer an audio signal, the dynamic range of which has been adjusted by using the second DRC 324, to the second speaker 250.

An electronic device according to various embodiments (for example, the electronic device 200 in FIG. 2) may include: a first speaker (for example, the first speaker 240 in FIG. 2) disposed on a side end of the electronic device; a second speaker (for example, the second speaker 250 in FIG. 2) disposed on a different side end of the electronic device; at least one sensor (for example, the sensor module 260 in FIG. 2); and a processor (for example, the processor 210 in FIG. 2). The processor may be configured to: receive a first audio signal; acquire a first channel signal and a second channel signal by using the first audio signal; acquire state information related to the electronic device by using the at least one sensor; correct at least a part of the first channel signal, at least based on the state information; output the corrected first channel signal by using the first speaker; and output the second channel signal by using the second speaker.

According to various embodiments, the at least one sensor of the electronic device may include at least one of a gyro sensor, an acceleration sensor, or a motion sensor. The processor may be configured to acquire a movement state of the electronic device as at least a part of the state information by using at least one of the gyro sensor, the acceleration sensor, or the motion sensor.

According to various embodiments, the at least one sensor of the electronic device may include at least one of a proximity sensor or a touch sensor. The processor may be configured to acquire a state of proximity between the electronic device and a user as at least a part of the state information by using at least one of the proximity sensor or the touch sensor.

According to various embodiments, the electronic device may further include a microphone. The processor may be configured to: analyze a change in an echo path by using the microphone; and acquire a state of proximity between the electronic device and a user as at least a part of the state information, based on the analyzed echo path.

According to various embodiments, the state information of the electronic device may include a movement state of the electronic device or a state of proximity between the electronic device and a user. The processor may be configured to apply a designated gain to the first channel signal in case that the processor identifies that the movement state is not fixed, and the state of proximity of the electronic device is proximate.

According to various embodiments, the state information of the electronic device may include a movement state of the electronic device or a state of proximity between the electronic device and a user. The processor may be configured to filter at least a partial frequency band of the first channel signal in case that the processor identifies that the movement state is not fixed, and that the state of proximity is proximate.

According to various embodiments, the state information of the electronic device may include a movement state of the electronic device or a state of proximity between the electronic device and a user. The processor may be configured to adjust a dynamic range of the first channel signal within a designated range in case that the processor identifies that the movement state is not fixed, and that the state of proximity is proximate.

According to various embodiments, the processor of the electronic device may be configured to: receive a second audio signal before receiving the first audio signal; and output the second audio signal while increasing a volume level thereof in a stepwise manner by using the first speaker and the second speaker.

According to various embodiments, the processor of the electronic device may be configured to: receive a second audio signal; identify whether or not the electronic device is in an idle state; and correct the second audio signal, based on the idle state.

According to various embodiments, the electronic device may be configured to: acquire a third channel signal and a fourth channel signal by using the second audio signal; and correct at least a part of the third channel signal, at least based on the state information.

Figure 4:
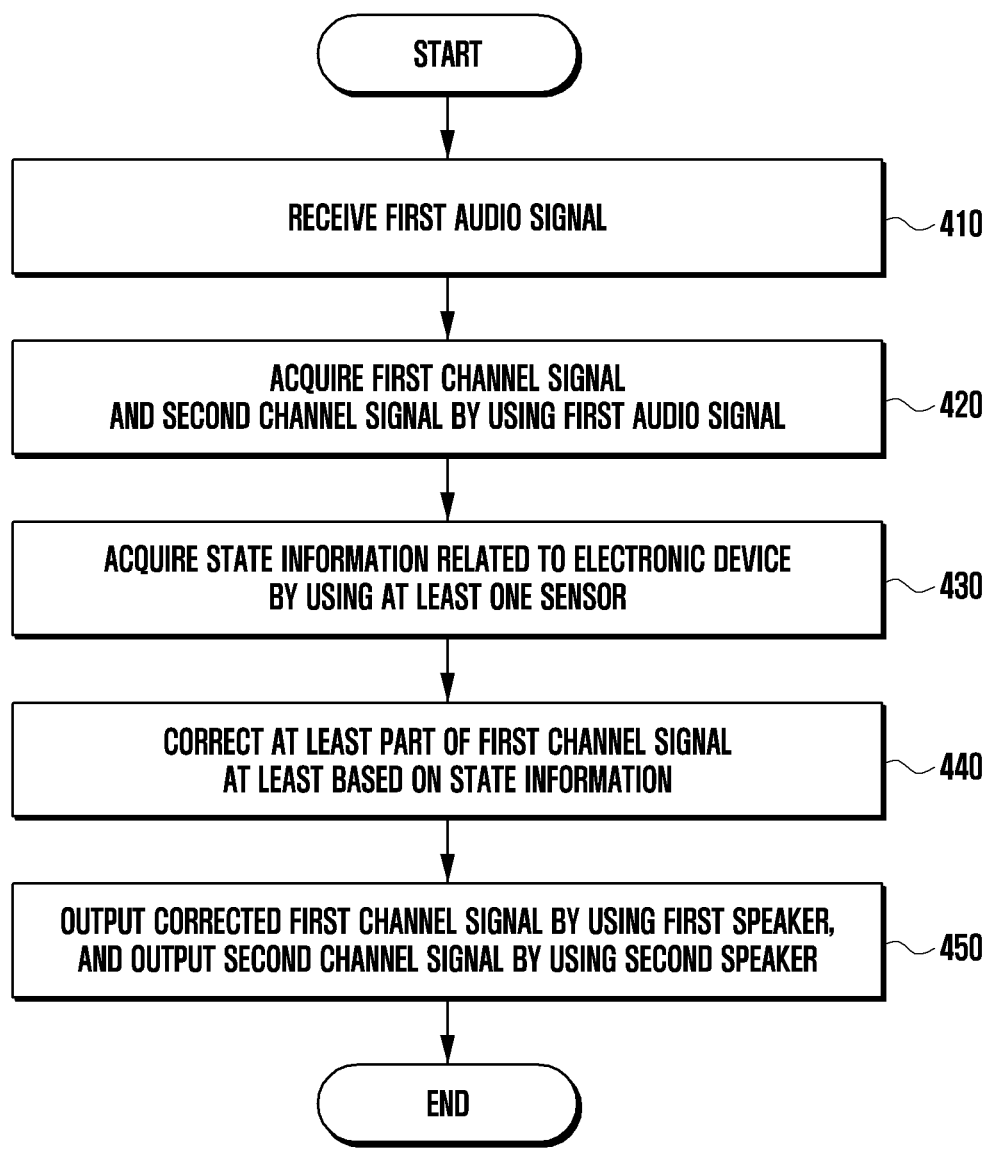
FIG. 4 is a flowchart illustrating a method for processing a stereo audio signal according to various embodiments.

FIG. 4 is a flowchart illustrating a method for processing a stereo audio signal according to various embodiments.

Referring to FIG. 4, in operation 410, a processor 120 of an electronic device 101 may receive a first audio signal. According to an embodiment, the first audio signal may include various audio signals received from at least one other electronic device (for example, the electronic device 102, the electronic device 104, or the server 108 in FIG. 1) through a communication module (for example, the communication module 190 in FIG. 1). For example, the first audio signal may include a voice signal of a counterpart received for a speaker call.

According to various embodiments of the disclosure, the electronic device 101 may be in a state in which the same is configured to output a first audio by using at least two speakers (for example, first speaker 240 and second speaker 250). For example, the electronic device 101 may be in a state in which the same has switched to a speaker call mode at the user's request while a call proceeds in a handset call mode.

In operation 420, the processor 120 of the electronic device 101 may acquire a first channel signal and a second channel signal by using a first audio signal. For example, the electronic device 101 may acquire a first channel signal and a second channel signal by decoding a first audio signal including a stereo signal. As another example, the electronic device 101 may acquire a first channel signal and a second channel signal by stereo-upmixing a first audio signal including a mono signal. According to an embodiment, the electronic device 101 may extract one of an interchannel phase difference (IPD), an interchannel level difference (ILD), an interchannel coherence (IC), or an overall phase difference (OPD), included in a first audio signal, and may stereo-upmix the first audio signal.

In operation 430, the processor 120 of the electronic device 101 may acquire state information related to the electronic device 101 by using at least one sensor (for example, the sensor module 176 in FIG. 1 or the sensor module 260 in FIG. 2).

According to various embodiments, the electronic device 101 may identify the movement state of the electronic device 101 by using at least one sensor. According to an embodiment, the electronic device 101 may identify the movement state of the electronic device 101 by using at least one of a gyro sensor, an acceleration sensor, or a motion sensor. For example, the electronic device 101 may identify whether the electronic device 101 is placed on the floor horizontally or fixed to a docking station, for example, by using at least one of a gyro sensor, an acceleration sensor, or a motion sensor. According to an embodiment, the electronic device 101 may sense a motion of the user bringing the electronic device 101 to his/her ear.

According to various embodiments, the electronic device 101 may identify the state of proximity between the electronic device 101 and the user by using at least one sensor. According to an embodiment, the electronic device 101 may identify the state of proximity between the electronic device 101 and the user by using at least one of a proximity sensor, a grip sensor, or a touch sensor. For example, the electronic device 101 may identify the user's grip state and/or the state of proximity between the electronic device 101 and the user (for example, face or ear) by using at least one of a proximity sensor, a grip sensor, or a touch sensor. That is, the electronic device 101 may identify whether or not the user is making a speaker call with the electronic device 101 in contact with his/her ear.

According to an embodiment, the electronic device 101 may identify the state of proximity between the electronic device 101 and the user (for example, face or ear) by analyzing a change in an echo path. For example, the state of proximity is identified by using the fact that the existence of an object near the speaker of the electronic device 101 changes the characteristics of a signal flowing into a microphone (for example, embedded microphone) in a specific position after being output by the speaker. For example, the characteristics of the echo path may differ between when the electronic device 101 is placed on the floor and when the user's holding the electronic device near his/her ear. Therefore, the electronic device 101 may identify the state of proximity between the electronic device 101 and the user by analyzing such a change in the echo path.

According to an embodiment, the electronic device 101 may identify the state of proximity between the electronic device 101 and the user, at least based on the movement state of the electronic device 101. For example, if it is identified that the electronic device 101 is in a movement state, the electronic device 101 may not recognize a proximate object as the user's face (for example, ear). For example, the electronic device 101 may recognize a proximate object, which is detected while the electronic device 101 is placed on the floor horizontally or is fixed to a docking station, as the user's hand, belongings, or the like.

In operation 440, the processor 120 of the electronic device 101 may correct at least a part of the first channel signal, at least based on state information.

According to various embodiments, the processor 120 (or the first gain adjustment unit 312 in FIG. 3) of the electronic device 101 may adjust the loudness of the first channel signal by applying a designated gain to the first channel signal. For example, the processor 120 may correct the first channel signal such that the first speaker 240 outputs a value equal to/lower than a predetermined volume level.

According to various embodiments, the processor 120 (or the first filter 313 in FIG. 3) of the electronic device 101 may reduce or adjust energy in a specific frequency band of the first channel signal. For example, the processor 120 may filter at least a part of the first channel signal by using a high-pass filter.

According to various embodiments, the processor 120 (or the first DRC 314 in FIG. 3) of the electronic device 101 may adjust the dynamic range of the first channel signal within a predetermined range. The processor 120 may adjust the amplification ratio of an audio signal such that the dynamic range of the first channel signal falls within a predetermined range. For example, the processor 120 may remove a sound exceeding a predetermined range or adjust the ratio of the entire dynamic range such that the same lies within the predetermined range.

In operation 450, the processor 120 of the electronic device 101 may output the corrected first channel signal by using the first speaker 240, and may output the second channel signal by using the second speaker 250.

Figure 5:
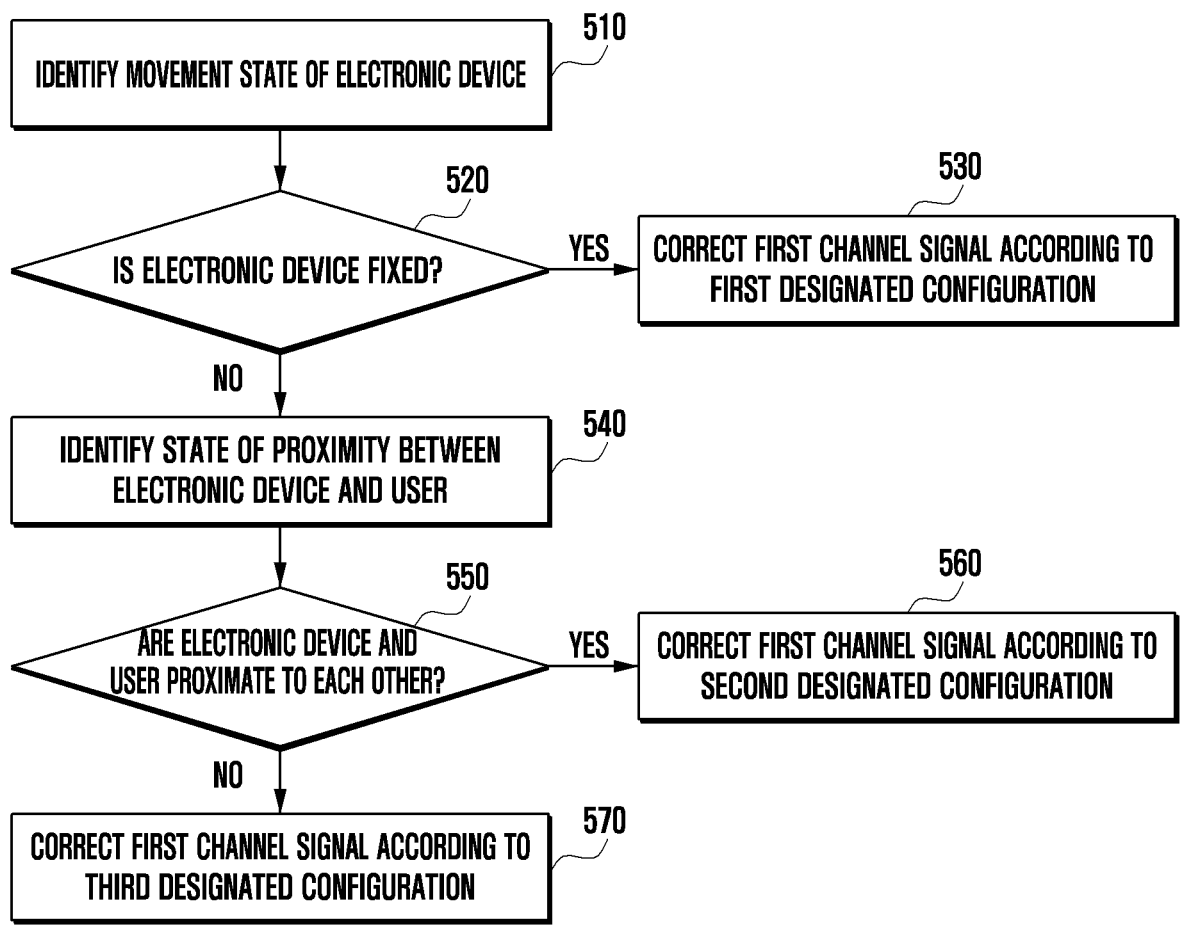
FIG. 5 is a flowchart illustrating a method for correcting a first channel signal according to various embodiments.

FIG. 5 is a flowchart illustrating a method for correcting a first channel signal according to various embodiments.

FIG. 5 may be understood as a detailed flowchart of operation 440 in FIG. 4.

Referring to FIG. 5, in operation 510, the processor 120 of the electronic device 101 may identify the movement state of the electronic device 101. For example, the electronic device 101 may identify the movement state of the electronic device 101 by using at least one of a gyro sensor, an acceleration sensor, or a motion sensor.

If it is identified in operation 520 that the electronic device 101 is fixed, the processor 120 of the electronic device 101 may correct a first channel signal according to a first designated configuration in operation 530. For example, if it is identified that the electronic device 101 is placed on the floor horizontally or is fixed to a docking station, the processor 120 may correct the first channel signal according to the first designated configuration. The first designated configuration may instruct the first channel signal, for example, to be corrected to the maximum output value or to be corrected so as to correspond to the second channel signal. For example, since the electronic device 101 is recognized as being far from the user (for example, face or ears), the first channel signal may be corrected such that an efficient output can be made by using a stereo speaker.

Again, if it is identified in operation 520 that the electronic device 101 is not fixed, the processor 120 of the electronic device 101 may identify, in operation 540, the state of proximity between the electronic device 101 and the user. For example, the processor 120 may identify the state of proximity between the electronic device 101 and the user by using at least one of a proximity sensor, a grip sensor, or a touch sensor. In another embodiment, the processor 120 may identify the state of proximity between the electronic device 101 and the user by analyzing a change in an echo path.

If it is identified in operation 550 that the electronic device 101 and the user are proximate to each other, the processor 120 of the electronic device 101 may correct the first channel signal according to a second designated configuration in operation 560. For example, if it is identified that the electronic device 101 and the user (for example, face or ears) are proximate to each other, the processor 120 may correct the first channel signal according to the second designated configuration. The second designated configuration may instruct the first channel signal, for example, to be corrected so as to have a loudness level equal to/lower than a first designated loudness level. For example, the electronic device 101 may recognize that the user is holding the electronic device 101 near the face (or ear) and may correct the first channel signal level to a predetermined volume level such that the user is not inconvenienced (for example, audibly impaired). [89] If it is identified in operation 550 that the electronic device 101 and the user are not proximate to each other, the processor 120 of the electronic device 101 may correct the first channel signal according to a third designated configuration in operation 570. The third designated configuration may instruct the first channel signal, for example, to be corrected so as to have a loudness level equal to/lower than a second designated level which is higher than the first designated loudness level. For example, the electronic device 101 may recognize that the user is holding the electronic device 101 by hand, not near his/her face (or ears). Therefore, the electronic device 101 may correct the first channel signal to a predetermined volume level such that the user is not inadvertently inconvenienced.

Figure 6:
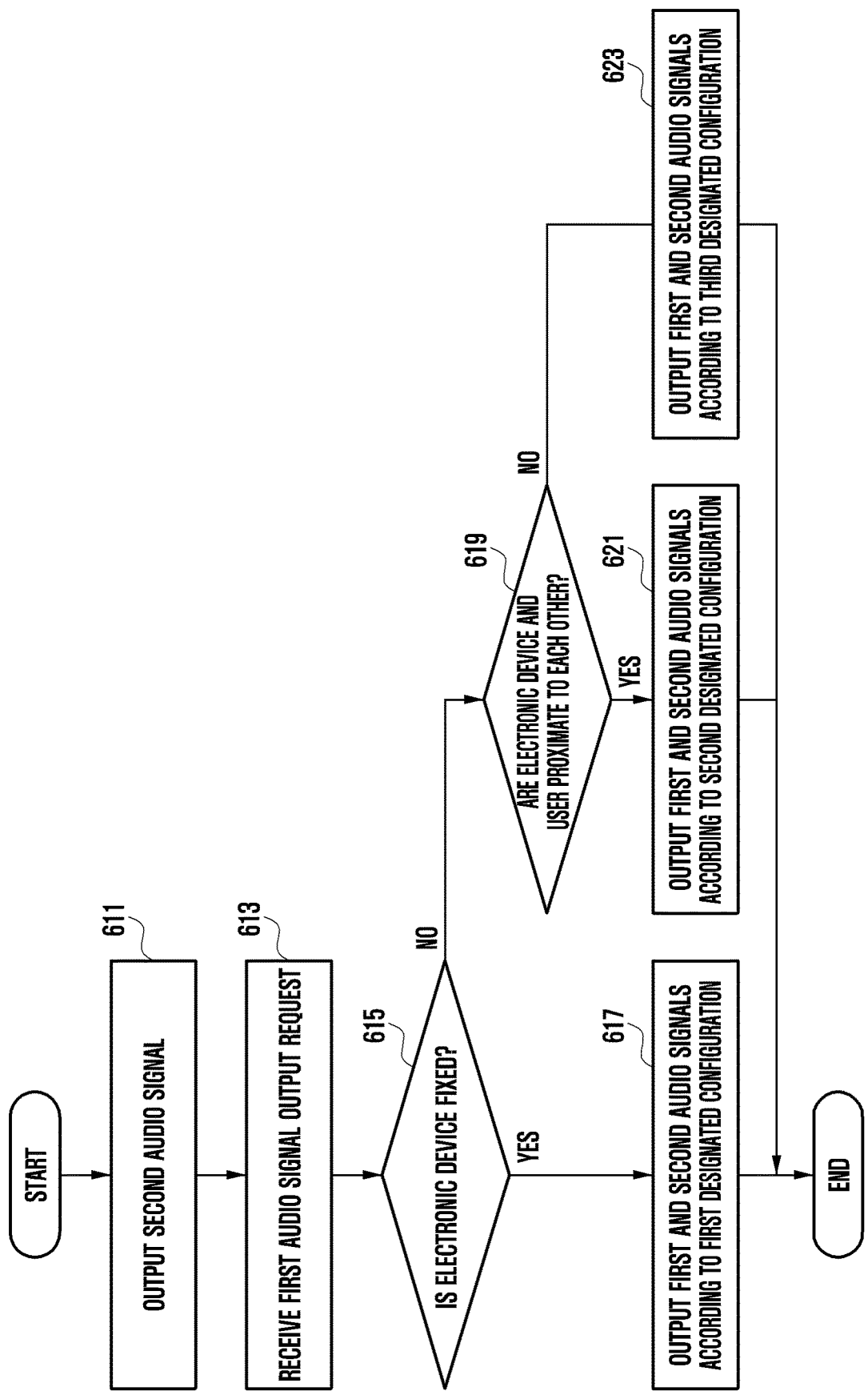
FIG. 6 is a flowchart illustrating a method for processing a stereo audio signal according to various embodiments.

FIG. 6 is a flowchart illustrating a method for processing a stereo audio signal according to various embodiments.

Referring to FIG. 6, in operation 611, a processor 120 of an electronic device 101 may output a second audio signal by using a stereo speaker (for example, first speaker 240 and second speaker 250). For example, the electronic device 101 may output a second audio signal following music or moving image playback. According to an embodiment, the electronic device 101 may increase the volume of the second audio signal in a stepwise manner.

In operation 613, the processor 120 of the electronic device 101 may receive a first audio signal. The first audio signal may include various audio signals received, for example, from at least one other external electronic device (for example, the electronic device 102, the electronic device 104, or the server 108 in FIG. 1) through a wireless communication module. According to various embodiments, the processor 120 of the electronic device 101 may acquire a first channel signal and a second channel signal by using the first audio signal.

In operation 615, the processor 120 of the electronic device 101 may identify whether or not the electronic device 101 is in a movement state.

If it is identified in operation 615 that the electronic device 101 is fixed, the processor 120 of the electronic device 101 may correct the first and second audio signals according to a first designated configuration in operation 617. For example, if it is identified that the electronic device 101 is placed on the floor horizontally or if fixed to a docking station, the processor 120 may correct the first and second audio signals according to the first designated configuration. For example, the processor 120 may correct the first and second audio signals such that an efficient output can be made by using a stereo speaker.

Again, if it is identified in operation 615 that the electronic device 101 is not fixed, the processor 120 of the electronic device 101 may identify, in operation 619, whether or not the electronic device 101 and the user are proximate to each other.

If it is identified in operation 619 that the electronic device 101 and the user are proximate to each other, the processor 120 of the electronic device 101 may correct the first and second audio signals according to a second designated configuration in operation 621. For example, the first and second audio signals, which are output by using a first speaker 240, may be corrected so as to have a loudness level equal to/lower than a first designated loudness level. For example, the electronic device may recognize that the user is holding electronic device near his/her ear in order to make a phone call.

Again, if it is identified in operation 619 that the electronic device 101 and the user are not proximate to each other, the processor 120 of the electronic device 101 may correct the first and second audio signals according to a third designated configuration in operation 623. For example, the first and second audio signals, which are output by using the first speaker 240, may be corrected so as to have a loudness level equal to/lower than a second designated level which is higher than the first designated loudness level. For example, the electronic device may recognize that the user is holding the electronic device by hand, not near his/her ears.

FIG. 7 is a flowchart illustrating a method for processing a stereo audio signal according to various embodiments.

Referring to FIG. 7, in operation 711, a processor 120 of an electronic device 101 may receive a second audio signal output request. For example, the electronic device 101 may receive a second audio signal output request in order to play a notification sound or a ringtone.

In operation 713, the processor 120 of the electronic device 101 may identify whether or not the electronic device 101 is in an idle state. As used herein, the idle state may refer to a state in which there is no audio output, a work standby state, or the like. For example, the idle state may refer to a state in which a first audio signal and/or a different second audio signal (for example, bell sound, media sound, touch sound, or the like) are not output, and in which no operation of the electronic device 101 by the user is sensed.

If it is determined in operation 713 that the electronic device 101 is in an idle state, the processor 120 of the electronic device 101 may correct the second audio signal according to a first designated configuration in operation 715. For example, the electronic device 101 may correct the second audio signal such that the volume thereof increases in a stepwise manner.

Again, if it is determined in operation 713 that the electronic device 101 is not in an idle state, the processor 120 of the electronic device 101 may identify, in operation 717, whether or not a first audio signal is currently output. For example, the processor 120 may identify whether or not the user is making a call in a speaker call mode.

If it is identified in operation 717 that no first audio signal is currently output, the processor 120 of the electronic device 101 may output the second audio signal according to a second designated configuration in operation 719. For example, if the electronic device 101 currently outputs a different second audio signal (for example, bell sound, media sound, touch sound, or the like), the processor 120 may reduce the volume level of the different second audio signal and may correct the second audio signal to the maximum output value such that the user can recognize the notification sound or ringtone. As another example, if the electronic device 101 does not currently output the different second audio signal, the processor 120 may correct the second audio signal such that the volume thereof increases in a stepwise manner.

Again, if it is identified in operation 717 that the first audio signal is currently output, the processor 120 of the electronic device 101 may identify the movement state of the electronic device 101 in operation 721.

If it is identified in operation 721 that the electronic device 101 is fixed, the processor 120 of the electronic device 101 may correct the first and second audio signals according to a third designated configuration in operation 723. For example, if it is identified that the electronic device 101 is placed on the floor horizontally or is fixed to a docking station, the processor 120 may correct the first and second audio signals according to the third designated configuration in operation 723. For example, the processor 120 may correct the second audio signal to the maximum output value such that the user can recognize the notification sound or ringtone.

Again, if it is identified in operation 721 that the electronic device 101 is not fixed, the processor 120 of the electronic device 101 may identify the state of proximity between the electronic device 101 and the user in operation 725.

If it is identified in operation 725 that the electronic device 101 and the user are proximate to each other, the processor 120 of the electronic device 101 may correct the first and second audio signals according to a fourth designated configuration in operation 727. For example, the processor 120 may correct the first and second audio signals, which are output by using a first speaker 240, so as to have a loudness level equal to/lower than a first designated loudness level. For example, the processor 120 may acquire a third channel signal and a fourth channel signal by using the second audio signal, and may correct a first channel signal and a third channel signal, which are to be output through the first speaker.

Again, if it is identified in operation 725 that the electronic device 101 and the user are not proximate to each other, the processor 120 of the electronic device 101 may correct the first and second audio signals according to a fifth designated configuration in operation 729. For example, the processor 120 may correct first and second audio signals, which are output by using the first speaker 240, so as to have a loudness level equal to/lower than a second designated level which is higher than the first designated loudness level. For example, the processor 120 may acquire a third channel signal and a fourth channel signal by using the second audio signal, and may correct a first channel signal and a third channel signal, which are to be output through the first speaker.

A method for processing a stereo audio signal by an electronic device including a first speaker and a second speaker, according to various embodiments, may include the operations of: receiving a first audio signal (for example, operation 410 in FIG. 4); acquiring a first channel signal and a second channel signal by using the first audio signal (for example, operation 420 in FIG. 4); acquiring state information related to the electronic device by using at least one sensor (for example, operation 430 in FIG. 4); correcting at least a part of the first channel signal, at least based on the state information (for example, operation 440 in FIG. 4); and outputting the corrected first channel signal by using the first speaker and outputting the second channel signal by using the second speaker (for example, operation 450 in FIG. 4).

In connection with the method for processing a stereo audio signal according to various embodiments, the at least one sensor may include at least one of a gyro sensor, an acceleration sensor, or a motion sensor. The operation of acquiring state information related to the electronic device may include an operation of identifying a movement state of the electronic device by using at least one of the gyro sensor, the acceleration sensor, or the motion sensor (for example, operation 510 in FIG. 5).

In connection with the method for processing a stereo audio signal according to various embodiments, the at least one sensor may include at least one of a proximity sensor or a touch sensor. The operation of acquiring state information related to the electronic device may include an operation of identifying a state of proximity between the electronic device and a user by using at least one of the proximity sensor or the touch sensor (for example, operation 540 in FIG. 5).

The operation of acquiring state information related to the electronic device, in connection with the method for processing a stereo audio signal according to various embodiments, may include the operations of analyzing a change in an echo path by using the microphone, and identifying a state of proximity between the electronic device and a user, based on the analyzed echo path.

The state information, in connection with the method for processing a stereo audio signal according to various embodiments, may include a movement state of the electronic device or a state of proximity between the electronic device and a user. The operation of correcting at least a part of the first channel signal may include an operation of applying a designated gain to the first channel signal in case of identifying that the movement state is not fixed, and the state of proximity is proximate.

The state information, in connection with the method for processing a stereo audio signal according to various embodiments, may include a movement state of the electronic device or a state of proximity between the electronic device and a user. The operation of correcting at least a part of the first channel signal may include an operation of filtering at least a partial frequency band of the first channel signal in case that the processor identifies that the movement state is not fixed, and that the state of proximity is proximate.

The state information, in connection with the method for processing a stereo audio signal according to various embodiments, may include a movement state of the electronic device or a state of proximity between the electronic device and a user. The operation of correcting at least a part of the first channel signal may include an operation of adjusting a dynamic range of the first channel signal within a designated range in case that the processor identifies that the movement state is not fixed, and that the state of proximity is proximate.

The method for processing a stereo audio signal according to various embodiments may further include the operations of: receiving a second audio signal before receiving the first audio signal; and outputting the second audio signal while increasing a volume level thereof in a stepwise manner by using the first speaker and the second speaker.

The method for processing a stereo audio signal according to various embodiments may further include the operations of: receiving a second audio signal; identifying whether or not the electronic device is in an idle state; and correcting the second audio signal, based on the idle state.

The method for processing a stereo audio signal according to various embodiments may further include the operations of: acquiring a third channel signal and a fourth channel signal by using the second audio signal; and correcting at least a part of the third channel signal, at least based on the state information.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The invention claimed is:

1. An electronic device comprising:
a first speaker disposed on a side end of the electronic device;
a second speaker disposed on a different side end of the electronic device;
at least one sensor; and
a processor,
wherein the processor is configured to:
receive a first audio signal;
acquire a first channel signal and a second channel signal by using the first audio signal;
acquire state information related to the electronic device by using the at least one sensor, wherein the state information comprises a movement state of the electronic device and a state of proximity between the electronic device and a user;
when the processor identifies that the movement state is fixed, correct the first channel signal to be at a first loudness level;
when the processor identifies that the movement state is not fixed and the state of proximity between the electronic device and the user is proximate, correct the first channel signal to be at a second loudness level lower than the first loudness level,
when the processor identifies that the movement state is not fixed and the state of proximity between the electronic device and the user is not proximate, correct the first channel signal to be at a third loudness level lower than or equal to the first loudness level but higher than the second loudness level,
output the corrected first channel signal by using the first speaker; and output the second channel signal by using the second speaker;
receive a second audio signal output request;
identify whether the electronic device is in an idle state;
if it is determined that the electronic device is in the idle state, correct a second audio signal according to a first designated configuration;
if it is determined that the electronic device is not in the idle state, identify whether the first audio signal is currently output;
if it is identified that the first audio signal is not currently output, output the second audio signal according to a second designated configuration;
if it is identified that the first audio signal is currently output, identify the movement state of the electronic device;
if it is identified that the electronic device is fixed, correct the first and second audio signals according to a third designated configuration;
if it is identified that the electronic device is not fixed, identify the state of proximity between the electronic device and the user;

if it is identified that the electronic device and the user are proximate to each other, correct the first and second audio signals according to a fourth designated configuration; and if it is identified that the electronic device and the user are not proximate to each other, correct the first and second audio signals according to a fifth designated configuration.

2. The electronic device as claimed in claim 1, wherein the at least one sensor comprises at least one of a gyro sensor, an acceleration sensor, or a motion sensor, and the processor is configured to acquire the movement state of the electronic device as at least a part of the state information by using at least one of the gyro sensor, the acceleration sensor, or the motion sensor.

3. The electronic device as claimed in claim 1, wherein the at least one sensor comprises at least one of a proximity sensor or a touch sensor, and the processor is configured to acquire the state of proximity between the electronic device and the user as at least a part of the state information by using at least one of the proximity sensor or the touch sensor.

4. The electronic device as claimed in claim 1, further comprising a microphone, wherein the processor is configured to:
analyze a change in an echo path by using the microphone; and
acquire the state of proximity between the electronic device and the user as at least a part of the state information, based on the analyzed echo path.

5. The electronic device as claimed in claim 1, wherein the processor is configured to apply a designated gain to the first channel signal in case that the processor identifies that the movement state is not fixed, and the state of proximity between the electronic device and the user is proximate.

6. The electronic device as claimed in claim 1, wherein the processor is configured to filter at least a partial frequency band of the first channel signal in case that the processor identifies that the movement state is not fixed, and that the state of proximity is proximate.

7. The electronic device as claimed in claim 1, wherein the processor is configured to adjust a dynamic range of the first channel signal within a designated range in case that the processor identifies that the movement state is not fixed, and that the state of proximity is proximate.

8. The electronic device as claimed in claim 1, wherein the processor is configured to:
receive a second audio signal before receiving the first audio signal; and
output a second audio signal while increasing a volume level thereof in a stepwise manner by using the first speaker and the second speaker.

9. A method for processing a stereo audio signal by an electronic device comprising a first speaker and a second speaker, the method comprising:
receiving a first audio signal;
acquiring a first channel signal and a second channel signal by using the first audio signal;
acquiring state information related to the electronic device by using at least one sensor, wherein the state information comprises a movement state of the electronic device and a state of proximity between the electronic device and a user;
when the movement state is fixed, correcting the first channel signal to be at a first loudness level;
when the movement state is not fixed and the state of proximity between the electronic device and the user is proximate, correcting the first channel signal to be at a second loudness level lower than the first loudness level;
when the movement state is not fixed and the state of proximity between the electronic device and the user is not proximate, correcting the first channel signal to be at a third loudness level lower than or equal to the first loudness level but higher than the second loudness level; and
outputting the corrected first channel signal by using the first speaker and outputting the second channel signal by using the second speaker;
receiving a second audio signal output request identifying whether the electronic device is in an idle state;
when it is determined that the electronic device is in the idle state, correcting a second audio signal according to a first designated configuration;
when it is determined that the electronic device is not in the idle state, identifying whether the first audio signal is currently output;
when it is identified that the first audio signal is not currently output, outputting the second audio signal according to a second designated configuration;
when it is identified that the first audio signal is currently output, identifying the movement state of the electronic device;
when it is identified that the electronic device is fixed, correcting the first and second audio signals according to a third designated configuration;
when it is identified that the electronic device is not fixed, identifying the state of proximity between the electronic device and the user;
when it is identified that the electronic device and the user are proximate to each other, correcting the first and second audio signals according to a fourth designated configuration; and
when it is identified that the electronic device and the user are not proximate to each other, correcting the first and second audio signals according to a fifth designated configuration.

10. The method as claimed in claim 9, wherein the at least one sensor comprises at least one of a gyro sensor, an acceleration sensor, or a motion sensor, and
wherein the acquiring state information related to the electronic device comprises identifying the movement state of the electronic device by using at least one of the gyro sensor, the acceleration sensor, or the motion sensor.

11. The method as claimed in claim 10, wherein the at least one sensor comprises at least one of a proximity sensor or a touch sensor, and
wherein the acquiring state information related to the electronic device comprises identifying the state of proximity between the electronic device and the user by using at least one of the proximity sensor or the touch sensor.

12. The method as claimed in claim 10, wherein the acquiring state information related to the electronic device comprises analyzing a change in an echo path by using a microphone, and identifying the state of proximity between the electronic device and the user, based on the analyzed echo path.

13. The method as claimed in claim 9, wherein the correcting of the first channel signal comprises applying a designated gain to the first channel signal in case of identifying that the movement state is not fixed, and the state of proximity is proximate.

\* \* \* \* \*